United States Patent
Kimura et al.

(10) Patent No.: US 7,105,611 B2
(45) Date of Patent: Sep. 12, 2006

(54) THERMOPLASTIC ELASTOMER COMPOSITION

(75) Inventors: Katsuhiko Kimura, Hyogo (JP); Kenji Noda, Hyogo (JP); Hironari Nakabayashi, Osaka (JP); Taizo Aoyama, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/532,893

(22) PCT Filed: Oct. 16, 2003

(86) PCT No.: PCT/JP03/13274

§ 371 (c)(1),
(2), (4) Date: Apr. 27, 2005

(87) PCT Pub. No.: WO2004/044050

PCT Pub. Date: May 27, 2004

(65) Prior Publication Data

US 2006/0004144 A1   Jan. 5, 2006

(30) Foreign Application Priority Data

Nov. 11, 2002 (JP) ............................... 2002-326407
Dec. 26, 2002 (JP) ............................... 2002-376757
Jul. 2, 2003 (JP) ............................... 2003-190111
Jul. 4, 2003 (JP) ............................... 2003-191722

(51) Int. Cl.
  *C08L 23/22* (2006.01)
  *C08L 23/26* (2006.01)
  *C08J 3/24* (2006.01)

(52) U.S. Cl. ............... 525/314; 525/240; 525/319; 525/330.9; 525/342; 526/348.7

(58) Field of Classification Search ............... 525/314, 525/240, 319, 330.9, 342; 526/348.7
See application file for complete search history.

(56) References Cited

U.S. PATENT DOCUMENTS

| 6,147,160 A | 11/2000 | Wang et al. |
| 6,218,475 B1 * | 4/2001 | Hiiro et al. .............. 525/314 |
| 2004/0171750 A1 | 9/2004 | Nakabayashi et al. |

FOREIGN PATENT DOCUMENTS

| EP | 0 844 257 | * | 5/1998 |
| JP | 10-101869 | * | 10/1998 |
| JP | 11-100473 A | | 4/1999 |
| JP | 11-100508 A | | 4/1999 |

OTHER PUBLICATIONS

International Search Report from Corresponding International Application No. PCT/JP03/13274, dated Dec. 2, 2003.

* cited by examiner

*Primary Examiner*—James J. Seidleck
*Assistant Examiner*—Olga Asinovsky
(74) *Attorney, Agent, or Firm*—Brinks Hofer Gilson & Lione

(57) ABSTRACT

An object of the present invention is to provide a thermoplastic elastomer composition which is highly flexible while maintaining vibration damping properties, as a feature of an isobutylene polymer, and is excellent in moldability and rubber-like properties, and also has particularly improved permanent compression set. The object is achieved by a thermoplastic elastomer composition comprising (A) a composition obtained by crosslinking an isobutylene polymer having an alkenyl group at the molecular ends with a hydrosilyl group-containing compound while melt-kneading in the presence of at least one kind selected from an aromatic vinyl-containing thermoplastic elastomer and an olefinic resin, and (B) at least one kind selected from the group consisting of an aromatic vinyl-containing thermoplastic elastomer and an olefinic resin.

18 Claims, No Drawings

US 7,105,611 B2

THERMOPLASTIC ELASTOMER COMPOSITION

RELATED APPLICATIONS

This application is a nationalization of PCT application PCT/JP2003/013274 filed on Oct. 16, 2003, claiming priority to Japanese Application No. 2002-326407 filed on Nov. 11, 2002, Japanese Application No. 2002-376757 filed on Dec. 26, 2002, Japanese Application No. 2003-190111 filed on Jul. 2, 2003, and Japanese Application No. 2003-191722 filed on Jul. 4, 2003.

TECHNICAL FIELD

The present invention relates to a novel thermoplastic elastomer composition which is highly flexible while maintaining vibration damping properties, as a feature of an isobutylene polymer, and is excellent in moldability and rubber-like properties, and also has particularly improved permanent compression set.

BACKGROUND ART

As a polymer material having elasticity, those obtained by mixing rubbers such as natural and synthetic rubbers with crosslinking agents and reinforcers and crosslinking the mixture at high temperature under high pressure have commonly been used, heretofore. However, these rubbers require the step of crosslinking and molding at high temperature under high pressure for a long time and are therefore inferior in processability. Since the crosslinked rubbers exhibit no thermoplasticity, recycle molding can not be conducted, unlike thermoplastic resins. Therefore, there have recently been developed various thermoplastic elastomers which can be easily processed into formed articles by employing common melt-molding techniques such as hot-press molding, injection molding, and extrusion molding in the same manner as in case of conventional thermoplastic resins. As these thermoplastic elastomers, various polymers such as olefinic, urethane, ester, styrene and vinyl chloride polymers have been developed and are put on the market at present.

Among these polymers, styrenic thermoplastic elastomers are highly flexible and are excellent in rubber elasticity at normal temperature. As these styrenic thermoplastic elastomers, for example, there have been developed styrene-butadiene-styrene block copolymer (SBS) and styrene-isoprene-styrene block copolymer (SIS); styrene-ethylenebutylene-styrene block copolymer (SEBS) and styrene-ethylenepropylene-styrene block copolymer (SEPS) obtained by hydrogenating the above polymers. However, these block copolymers were insufficient in permanent compression set.

Also Kohyo Publication (National Publication of Translated Version) of WO93/14135 discloses an isobutylene block copolymer comprising a polymer block composed mainly of isobutylene and a polymer block composed mainly of an aromatic vinyl compound as a thermoplastic elastomer which is highly flexible and is excellent in rubber elasticity at normal temperature, and is also excellent in vibration damping properties, gas barrier properties and hermetical sealing properties as features of an isobutylene polymer. However, this isobutylene block copolymer is also insufficient in permanent compression set, like the above-described styrenic thermoplastic elastomers.

As a technique for improving the permanent compression set of this isobutylene block copolymer, Kohyo Publication (National Publication of Translated Version) of WO98/14518 discloses a thermoplastic polymer composition comprising an isobutylene block copolymer containing a polymer block composed mainly of isobutylene, and crosslinked article of a rubber, while Japanese Unexamined Patent Publication (Kokai) No. 11-293083 discloses a composition comprising an isobutylene block copolymer, a crystalline polyolefin and a plasticizer (softener). Although these composition have improved permanent compression set while maintaining features of the isobutylene polymer, thermoplastic elastomer compositions having more excellent permanent compression set are required.

DISCLOSURE OF THE INVENTION

In light of the above-described problems of the prior art, an object of the present invention is to provide a thermoplastic elastomer composition which is excellent in vibration damping properties, as a feature of an isobutylene polymer, and has satisfactory flexibility, moldability and rubber-like properties, and also has improved permanent compression set.

The present inventors have intensively studied and completed the present invention. Therefore, the present invention is directed to a thermoplastic elastomer composition comprising (A) a composition obtained by crosslinking an isobutylene polymer having an alkenyl group at the molecular ends with a hydrosilyl group-containing compound while melt-kneading in the presence of at least one kind selected from the group consisting of an aromatic vinyl-containing thermoplastic elastomer and an olefinic resin, and (B) at least one kind selected from the group consisting of an aromatic vinyl-containing thermoplastic elastomer and an olefinic resin.

Preferred embodiment of the present invention is directed to a thermoplastic elastomer composition wherein the content of at least one kind selected from the group consisting of an aromatic vinyl-containing thermoplastic elastomer and an olefinic resin is from 5 to 100 parts by weight based on 100 parts by weight of the isobutylene polymer having an alkenyl group at the molecular ends in the component (A).

Preferred embodiment of the present invention is directed to a thermoplastic elastomer composition wherein the content of the component (B) is from 5 to 100 parts by weight based on 100 parts by weight of the total amount of the component (A).

Preferred embodiment of the present invention is directed to a thermoplastic elastomer composition which further contains a softener (C) in the amount of 1 to 300 parts by weight based on 100 parts by weight of the isobutylene polymer having an alkenyl group at the molecular ends in the component (A).

Preferred embodiment of the present invention is directed to a thermoplastic elastomer composition wherein an allyl group is introduced into the molecular ends of the isobutylene polymer having an alkenyl group at the molecular ends in the component (A) by a substitution reaction of allyltrimethylsilane and chlorine.

Preferred embodiment of the present invention is directed to a thermoplastic elastomer composition wherein the isobutylene polymer having an alkenyl group at the molecular ends in the component (A) is a polymer which has a number average molecular weight of 1,000 to 500,000 and has at least 0.2 alkenyl groups per one molecule at the molecular ends.

Preferred embodiment of the present invention is directed to a thermoplastic elastomer composition wherein the isobutylene polymer having an alkenyl group at the molecular ends in the component (A) is a polymer having 50% by weight or more of isobutylene.

Preferred embodiment of the present invention is directed to a thermoplastic elastomer composition wherein the aromatic vinyl-containing thermoplastic elastomer in the components (A) and (B) is a block copolymer comprising a polymer block (a) composed mainly of an aromatic vinyl compound and a polymer block (b) composed mainly of isobutylene.

Preferred embodiment of the present invention is directed to a thermoplastic elastomer composition wherein the aromatic vinyl-containing thermoplastic elastomer in the components (A) and (B) is a block copolymer is a triblock copolymer which has a structure comprising a polymer block (a) composed mainly of an aromatic vinyl compound—a polymer block (b) composed mainly of isobutylene—a polymer block (a) composed mainly of an aromatic vinyl compound, and has a weight average molecular weight of 40,000 to 200,000.

Preferred embodiment of the present invention is directed to a thermoplastic elastomer composition wherein the olefinic resin in the component (A) is polypropylene.

Preferred embodiment of the present invention is directed to a thermoplastic elastomer composition wherein the olefinic resin in the component (A) is polyethylene.

Preferred embodiment of the present invention is directed to a thermoplastic elastomer composition wherein the olefinic resin in the component (B) is polypropylene.

Preferred embodiment of the present invention is directed to a thermoplastic elastomer composition wherein the olefinic resin in the component (B) is polyethylene.

Preferred embodiment of the present invention is directed to a thermoplastic elastomer composition wherein the olefinic resin in the component (A) is random polypropylene.

Preferred embodiment of the present invention is directed to a thermoplastic elastomer composition wherein the olefinic resin in the component (A) is high-density polyethylene.

Preferred embodiment of the present invention is directed to a thermoplastic elastomer composition wherein the olefinic resin in the component (B) is random polypropylene.

Preferred embodiment of the present invention is directed to a thermoplastic elastomer composition wherein the olefinic resin in the component (B) is high-density polyethylene.

Preferred embodiment of the present invention is directed to a thermoplastic elastomer composition wherein the softener (C) is paraffinic oil.

The thermoplastic elastomer composition of the present invention comprises (A) a composition obtained by crosslinking an isobutylene polymer having an alkenyl group at the molecular ends with a hydrosilyl group-containing compound while melt-kneading in the presence of at least one kind selected from the group consisting of an aromatic vinyl-containing thermoplastic elastomer and an olefinic resin, and (B) at least one kind selected from the group consisting of an aromatic vinyl-containing thermoplastic elastomer and an olefinic resin.

The isobutylene polymer having an alkenyl group at the molecular ends used in the present invention is a polymer wherein isobutylene accounts for 50% by weight or more, preferably 70% by weight or more, and more preferably 90% by weight or more, of the isobutylene polymer. The monomer other than isobutylene in the isobutylene polymer is not specifically limited as far as it is a cationically polymerizable monomer component, and examples thereof include aromatic vinyls; aliphatic olefins; dienes such as isoprene, butadiene, and divinylbenzene; vinyl ethers; and β-pinene. These monomers may be used alone, or two or more kinds of them may be used in combination.

The number average molecular weight of the isobutylene polymer is not specifically limited, but is preferably from 1,000 to 500,000, and particularly preferably from 5,000 to 200,000. When the number average molecular weight is less than 1,000, satisfactory mechanical properties are not achieved. On the other hand, it exceeds 500,000, moldability drastically deteriorates.

The alkenyl group of the isobutylene polymer having an alkenyl group at the molecular ends is not specifically limited as far as it is a group having a carbon-carbon double bond which is active to a crosslinking reaction with a hydrosilyl group-containing compound. Specific examples thereof include aliphatic unsaturated hydrocarbon groups such as vinyl group, allyl group, methylvinyl group, propenyl group, butenyl group, pentenyl group, and hexenyl group; and cyclic unsaturated hydrocarbon groups such as cyclopropenyl group, cyclobutenyl group, cyclopentenyl group, and cyclohexenyl group.

Examples of the method of introducing an alkenyl group into the molecular ends of an isobutylene polymer includes methods of reacting a polymer having a functional group such as hydroxyl group with a compound having an unsaturated group, thereby to introduce the unsaturated group into the polymer, as disclosed in Japanese Unexamined Patent Publication (Kokai) No. 3-152164 and Japanese Unexamined Patent Publication (Kokai) No. 7-304909. Examples of the method of introducing an unsaturated group into a polymer having a halogen atom include a method of conducting a Friedel-Crafts reaction with an alkenyl phenyl ether, a method of conducting a substitution reaction with allyltrimethylsilane in the presence of Lewis acid, and a method of conducting a Friedel-Crafts reaction with various phenols, thereby to introduce a hydroxyl group and conducting the alkenyl group-introducing reaction described above. Furthermore, as disclosed in U.S. Pat. No. 4,316,973, Japanese Unexamined Patent Publication (Kokai) No. 63-105005 and Japanese Unexamined Patent Publication (Kokai) No. 4-288309, the unsaturated group can be introduced during the polymerization of the monomer. Among these methods, the method of introducing an allyl group into the molecular ends by the substitution reaction of allyltrimethylsilane and chlorine is preferable in view of reactivity.

Although the amount of the alkenyl group at the molecular ends of the isobutylene polymer can be selected optionally according to the required properties, the isobutylene polymer is preferably a polymer having at least 0.2 alkenyl groups per one molecule at the molecular ends in view of permanent compression set after crosslinking. When the isobutylene polymer has less than 0.2 alkenyl groups, satisfactory effect of improving permanent compression set by crosslinking is not exerted sometimes.

The aromatic vinyl-containing thermoplastic elastomer used in the present invention includes, but are not limited to, a random copolymer and a block copolymer, and is preferably a block copolymer comprising a polymer block (a) composed mainly of an aromatic vinyl compound and a polymer block (b) composed mainly of isobutylene. The aromatic vinyl-containing thermoplastic elastomer is preferably a block copolymer comprising a polymer block (a) composed mainly of an aromatic vinyl compound and a polymer block (c) composed mainly of a conjugated diene compound, and a block copolymer obtained by hydrogenating the block copolymer. Among these block copolymers, a triblock copolymer comprising a polymer block (a) composed mainly of an aromatic vinyl compound—a polymer block (b) composed mainly of isobutylene—a polymer block (a) composed mainly of an aromatic vinyl compound is particularly preferable because the tensile strength increases.

The polymer block composed mainly of isobutylene as used herein refers to a block wherein isobutylene accounts for 50% by weight or more, preferably 70% by weight or more, and more preferably 90% by weight, of the polymer block. The monomer other than isobutylene in the polymer block composed mainly of isobutylene is not specifically limited as far as it is a cationically polymerizable monomer component, and examples thereof include aromatic vinyls; aliphatic olefins; dienes such as isoprene, butadiene, and divinylbenzene; vinyl ethers; and β-pinene. These monomers may be used alone, or two or more kinds of them may be used in combination.

Examples of the aromatic vinyl compound include styrene, α-methylstyrene, β-methylstyrene, p-methylstyrene, t-butylstyrene, monochlorostyrene, dichlorostyrene, methoxystyrene, indene, divinylbenzene, N,N-dimethyl-p-aminoethylstyrene, N,N-diethyl-p-aminoethylstyrene, and vinylpyridine. Among these compounds, styrene, α-methylstyrene, p-methylstyrene and indene are preferable in view of balance between cost, physical properties and productivity, and two or more kinds may be selected from these compounds.

Examples of the conjugated diene compound include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. In order to obtain a hydrogenated diene polymer which can be employed in the industrial field and is excellent in physical properties, 1,3-butadiene, isoprene and 1,3-pentadiene are preferable, and 1,3-butadiene and isoprene are particularly preferable.

The proportion of the aromatic vinyl compound in the aromatic vinyl-containing thermoplastic elastomer is not specifically limited, but is preferably from 5 to 80% by weight, and particularly preferably from 10 to 40% by weight, in view of balance between physical properties and processability.

Also the number average molecular weight of the aromatic vinyl-containing thermoplastic elastomer is not specifically limited, but is preferably from 15,000 to 500,000, and particularly preferably from 40,000 to 200,000. When the number average molecular weight is less than 15,000, mechanical properties such as tensile properties may become insufficient. On the other hand, when it exceeds 500,000, moldability may drastically deteriorate.

The olefinic resin used in the present invention is a homopolymer or copolymer containing a monomer selected from ethylene and α-olefin having 3 to 20 carbon atoms as a main component. Examples thereof include polyethylene (high-density polyethylene, low-density polyethylene, linear low-density polyethylene), polypropylene (isotactic-homopolypropylene, random polypropylene, blockpolypropylene, syndiotactic-homopolypropylene), poly-1-butene, ethylene-propylene copolymer, ethylene-1-butene copolymer, ethylene-1-hexene copolymer, and ethylene-1-octene copolymer. In view of heat resistance, polypropylene and polyethylene each having crystallinity are preferable. In view of mechanical properties, random polypropylene is most preferable. In view of permanent compression set, high-density polyethylene is most preferable.

In the present invention, the isobutylene polymer having an alkenyl group at the molecular ends forms a composition obtained by crosslinking with a hydrosilyl group—containing compound while melt-kneading in the presence of at least one kind selected from the group consisting of an aromatic vinyl-containing thermoplastic elastomer and an olefinic resin. Such a technique is generally referred to as dynamic crosslinking and is characterized in that a polymer network produced by proceeding of the crosslinking reaction while melt-kneading is cleaved by a shear force and exhibits thermoplasticity even after crosslinking, unlike conventional chemical crosslinking (static crosslinking). The isobutylene polymer usually has no functional group for crosslinking and a decomposition reaction may occur in a radical reaction employed commonly as a crosslinking reaction. In the present invention, introduction of an alkenyl group into the molecular ends of the isobutylene polymer enables a hydrosilylation reaction and also enables a crosslinking reaction which uses a hydrosilyl group-containing compound as a crosslinking agent. This hydrosilylation reaction has such an advantage that by-products are not produced and unnecessary side reaction does not arise.

In the present invention, the hydrosilyl group-containing compound required to obtain a crosslinked article of the isobutylene polymer having an alkenyl group at the molecular ends is not specifically limited and various compounds can be used. For example, there can be used linear polysiloxanes represented by the following general formula (I) or (II):

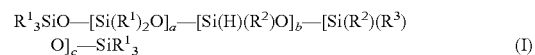

$$R^1{}_3SiO\text{—}[Si(R^1)_2O]_a\text{—}[Si(H)(R^2)O]_b\text{—}[Si(R^2)(R^3)O]_c\text{—}SiR^1{}_3 \quad (I)$$

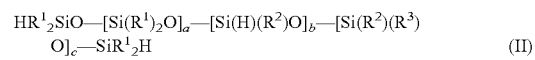

$$HR^1{}_2SiO\text{—}[Si(R^1)_2O]_a\text{—}[Si(H)(R^2)O]_b\text{—}[Si(R^2)(R^3)O]_c\text{—}SiR^1{}_2H \quad (II)$$

wherein $R^1$ and $R^2$ represents an alkyl group having 1 to 6 carbon atoms, or a phenyl group; $R^3$ represents an alkyl or aralkyl group having 1 to 10 carbon atoms; and a, b and c represent integers which satisfy the relations: $0 \leq a \leq 100$, $2 \leq b \leq 100$, and $0 \leq c \leq 100$, and cyclic siloxanes represented by the following general formula (III):

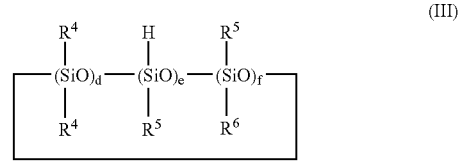

(III)

wherein $R^4$ and $R^5$ represent an alkyl group having 1 to 6 carbon atoms, or a phenyl group; $R^6$ represents an alkyl or aralkyl group having 1 to 10 carbon atoms; and d, e and f represent integers which satisfy the relations: $0 \leq d \leq 8$, $2 \leq e \leq 10$, and $0 \leq f \leq 8$, and also satisfy the relation: $3 \leq d+e+f \leq 10$. In view of good compatibility, among the above compounds having a hydrosilyl group (Si—H group), preferred are compounds represented by the following the general formula (IV):

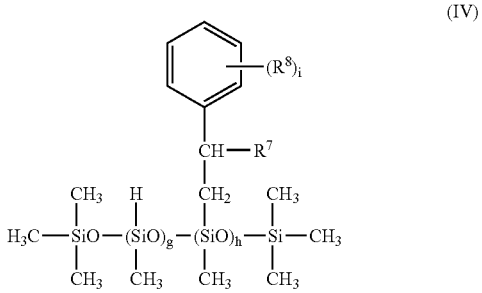

wherein g and h represent integers which satisfy the relations: $2 \leq g+h \leq 50$ and $2 \leq g$, $0 \leq h$; $R^7$ represents a hydrogen atom or a methyl group; $R^8$ represents a hydrocarbon group having 2 to 20 carbon atoms and may optionally have one or more aromatic rings; and i represents an integer which satisfies the relation: $0 \leq i \leq 5$.

While isobutylene polymer having an alkenyl group at the molecular ends and the hydrosilyl group-containing compound can be mixed in any ratio, a molar ratio of an alkenyl group to a hydrosilyl group is preferably within a range from 5 to 0.2, and more preferably from 2.5 to 0.4, in view of reactivity. When the molar ratio is more than 5, the resulting product is tacky and has poor permanent compression set because of insufficient crosslinking. On the other hand, when it is less than 0.2, since many active hydrosilyl groups are remained after crosslinking, a hydrogen gas is evolved by hydrolysis and the resulting crosslinked product may cause cracks and voids.

The crosslinking reaction of the isobutylene polymer and the hydrosilyl group-containing compound proceeds when two components are mixed and heated, and the reaction can be remarkably promoted by the addition of a crosslinking catalyst (hydrosilylation catalyst). The crosslinking catalyst is not specifically limited and examples thereof include radical initiators such as organic peroxides and azo compounds, and transition metal catalysts.

The radical initiator is not specifically limited and examples thereof include dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butylcumyl peroxide, and α,α'-bis(t-butylperoxy)isopropylbenzene; acyl peroxides such as benzoyl peroxide, p-chlorobenzoyl peroxide, m-chlorobenzoyl peroxide, 2,4-dichlorobenzoyl peroxide, and lauroyl peroxide; peracid esters such as t-butyl perbenzoate; peroxydicarbonates such as diisopropyl peroxydicarbonate and di-2-ethylhexyl peroxydicarbonate; peroxyketals such as 1,1-di(t-butylperoxy)cyclohexane and 1,1-di(t-butylperoxy)-3,3,5-trimethylcyclohexane; and azo compounds such as 2,2'-azobisisobutyronitrile, 2,2'-azobis-2-methylbutyronitrile, 1,1'-azobis-1-cyclohexanecarbonitrile, 2,2'-azobis(2,4-dimethylvaleronitrile), and 2,2'-azosiobutyrovaleronitrile.

Also the transition metal catalyst is not specifically limited and examples thereof include platinum metal; those obtained by dispersing solid platinum in carries such as alumina, silica and carbon black; chloroplatinic acid; complexes of chloroplatinic acid with alcohol, aldehyde or ketone; and platinum-olefin complexes, and platinum(0)-dialkenyltetramethyldisiloxane complexes. Examples of the catalyst other than platinum compounds include RhCl(PPh$_3$)$_3$, RhCl$_3$, RuCl$_3$, IrCl$_3$, FeCl$_3$, AlCl$_3$, PdCl$_2$.H$_2$O, NiCl$_2$, and TiCl$_4$. These catalysts may be used alone, or two or more kinds of them may be used in combination. Among these catalysts, platinumvinylsiloxane is most preferable in view of compatibility, crosslinking efficiency and scorch stability.

The amount of the catalyst is not specifically limited, but is preferably within a range from $10^{-1}$ to $10^{-8}$ mol, and more preferably from $10^{-3}$ to $10^{-6}$ mol, per mol of the alkenyl group of the isobutylene polymer. When the amount is less than $10^{-8}$ mol, crosslinking may not proceed sufficiently. On the other hand, when the amount is more than $10^{-1}$ mol, a remarkable effect is not exerted and, therefore, the amount is preferably less than $10^{-1}$ mol in view of economy.

In the present invention, the amount of at least one kinds selected from the group consisting of the aromatic vinyl-containing thermoplastic elastomer and the olefinic resin in the component (A) is from 0.5 to 900 parts by weight, and preferably from 5 to 100 parts by weight, based on 100 parts by weight of the isobutylene polymer having an alkenyl group at the molecular ends. When the amount exceeds 900 parts by weight, permanent compression set may deteriorates. On the other hand, when the amount is 100 parts by weight or less, since the concentration of the alkenyl group is sufficiently high, the reaction rate of the crosslinking reaction is preferably high. On the other hand, when the amount is less than 0.5 parts by weight, moldability may drastically deteriorate.

The composition, as the component (A) of the present invention, which is obtained by crosslinking an isobutylene polymer having an alkenyl group at the molecular ends with a hydrosilyl group-containing compound while melt-kneading in the presence of at least one kind selected from the group consisting of an aromatic vinyl-containing thermoplastic elastomer and an olefinic resin, can be produced by the method described below.

In case the composition is produced by a closed or open type batch-wise kneading apparatus, such as Labo Plastomill, Brabender, Banbury mixer, kneader, or roll, all components other than a crosslinking agent are previously mixed, charged in a kneading apparatus and then melt-kneaded until a homogeneous mixture is obtained. The crosslinking agent is added and, after the crosslinking reaction proceeds sufficiently, melt-kneading is terminated.

In case the composition is produced by using a continuous melt-kneading apparatus such as single-screw extruder or twin-screw extruder, all components other than a crosslinking agent are melt-kneaded by a melt-kneading apparatus such as extruder until a homogeneous mixture is obtained and the mixture is pelletized. After dry-blending the pellets with the crosslinking agent and the dry blend is further melt-kneaded by a melt-kneading apparatus such as extruder or Banbury mixer, thereby to dynamically crosslink the isobutylene polymer having an alkenyl group at the molecular ends. Alternatively, all components other than a crosslinking agent are melt-kneaded by a melt-kneading apparatus such as extruder and, after adding the crosslinking agent through an intermediate section of a cylinder of the extruder, the mixture is further melt-kneaded, thereby to dynamically crosslink the isobutylene polymer having an alkenyl group at the molecular ends.

The melt-kneading is preferably conducted at a temperature within a range from 140 to 210° C., and more preferably from 150 to 200° C. When the melt-kneading temperature is lower than 140° C., the aromatic vinyl-containing thermoplastic elastomer and the olefinic resin are not melted and may not mixed sufficiently. On the other hand, when the melt-kneading temperature is higher than 210° C., the isobutylene polymer may be thermally decomposed.

The present invention is characterized by further mixing a dynamically crosslinked composition as the component (A) with at least one kind selected from the group consisting of an aromatic vinyl-containing thermoplastic elastomer and an olefinic resin as the component (B). Such a two-stage step has such an advantage that the proportion of the isobutylene polymer having an alkenyl group at the molecular ends in the stage of producing the component (A), thereby making it possible to increase the reaction rate of the crosslinking reaction. In case a softener is added as the component (C), remarkable advantage is obtained. Although optimum reaction conditions vary depending on the kind and molecular weight of the aromatic vinyl-containing thermoplastic elastomer and olefinic resin in the component (A), a two-stage step makes it possible to control properties of the finally obtained thermoplastic elastomer composition within a wide range by selecting the kinds and molecular weights of the component (B), while the kind and molecular weight of the aromatic vinyl-containing thermoplastic elastomer and olefinic resin used in the production of the component (A) are the same. It is also possible to mix a component having a functional group which adversely affects the crosslinking reaction.

In invention, the amount of at least one kind selected from the group consisting of the aromatic vinyl-containing thermoplastic elastomer and the olefinic resin, as the component (B), is preferably from 5 to 200 parts by weight, and more preferably from 5 to 100 parts by weight, based on 100 parts by weight of the total amount of the component (A). When the amount of the component (B) exceeds 200 parts by weight, permanent compression set may drastically deteriorate. On the other hand, when the amount is less than 5 parts by weight, moldability may drastically deteriorate.

In case of melt-kneading the component (A) of the present invention with the component (B), a known method may be employed and the above-described batch-wise kneading apparatus and continuous kneading apparatus can be used. For example, there can be used a method of weighing the components (A) and (B), mixing them using a tumbler, a Henschel mixer or a ribbon blender, and melt-kneading the mixture using an extruder, a Banbury mixer or a roll. The kneading temperature is not specifically limited, but is preferably within a range from 100 to 250° C., and more preferably from 150 to 220° C. When the kneading temperature is lower than 100° C., the kneaded mixture may not be sufficiently melted. On the other hand, when the kneading temperature is higher than 250° C., deterioration by heat may initiate.

To the composition of the present invention, a softener (C) can be added to improve moldability and flexibility, in addition to the components (A) and (B). As the softener, mineral oil for use in the processing of rubber or a liquid or low-molecular weight synthetic oil can be used. The softener and plasticizer are often used in the same meaning and are not specifically identified in the present invention.

Examples of the mineral oil include paraffinic oil, naphthenic oil, and aromatic high-boiling petroleum fraction. Among these mineral oils, preferred is paraffinic oil which does adversely affect the crosslinking reaction. Examples of the liquid or low-molecular weight synthetic oil include polybutene, hydrogenated polybutene, liquid polybutadiene, hydrogenated liquid polybutadiene, and liquid poly ($\alpha$-olefins). These softeners may be used alone, or plural softeners may be used in combination.

The amount of the softener (C) is preferably from 1 to 300 parts by weight based on 100 parts by weight by of the isobutylene polymer having an alkenyl group at the molecular ends. When the amount exceeds 300 parts by weight, the resulting product may be tacky and has decreased mechanical strength.

The composition of the present invention can contain additives such as other thermoplastic resins, thermoplastic elastomers, rubbers, stabilizers, and fillers according to the required properties for various purposes as far as the physical properties are not adversely affected. Examples of the thermoplastic resin include polyolefin modified with maleic acid, maleic anhydride or glycidyl methacrylate, polymethylpentene, cyclic olefin (co)polymer, polystyrene, polyphenylene ether, polyamide, polyester, polyurethane, polycarbonate, ABS resin, polymethyl methacrylate, and polyvinyl chloride. Examples of the thermoplastic elastomer include olefinic, vinyl chloride, urethane, ester, and amide elastomers. Examples of the rubber include natural rubber, butadiene rubber, styrene-butadiene rubber, acrylonitrile-butadiene rubber, isoprene rubber, butyl rubber, ethylene-propylene rubber, acrylic rubber, silicone rubber, and fluororubber. Examples of the additive, which can be appropriately mixed, include hindered phenol, phosphorus and sulfur antioxidants; hindered amine ultraviolet absorbers; photostabilizers; pigments; surfactants; flame retardants; blocking inhibitors; antistatic agents; lubricants; silicone oils; fillers; and reinforcers. Examples of the inorganic filler, among fillers, include precipitated calcium carbonate, ground calcium carbonate, other calcium filler, hard clay, soft clay, kaolin clay, talc, wet silica, dry silica, amorphous silica, wollastonite, synthetic or natural zeolite, diatomaceous earth, quartz sand, pumice powder, slate powder, alumina, aluminum sulfate, barium sulfate, calcium sulfate, molybdenum disulfide, magnesium hydroxide, aluminum hydroxide, and those obtained by treating these inorganic fillers with a silane coupling agent. Two or more kinds of these additives can be used in combination. The hardness and tensile strength can be improved by mixing these inorganic fillers. When using metal hydroxides such as magnesium hydroxide and aluminum hydroxide as the inorganic filler, excellent flame resistance can be sometimes imparted. As the blocking inhibitor, for example, silica and zeolite are preferable and these may be natural or synthetic blocking inhibitors, and complete spherical crosslinked particles such as crosslinked acrylic complete spherical particles are also preferable. As the antistatic agent, N,N-bis-(2-hydroxyethyl)-alkylamines having an alkyl group having 12 to 18 carbon atoms and glycerin fatty acid ester are preferable. As the lubricant, fatty acid metal lubricants, fatty acid amide lubricants, fatty acid ester lubricants, fatty acid lubricant, aliphatic alcohol lubricant, partial ester of fatty acid and polyhydric alcohol, and paraffinic lubricant are preferably used. Two or more kinds selected from them may be used in combination.

BEST MODE FOR CARRYING OUT THE INVENTION

The present invention will be illustrated by the following examples which do not limit the present invention.

Before presenting the examples, various methods for measurement and various methods for evaluation are described.

(Hardness)

In accordance with JIS K 6352, a 12.0 mm thick pressed sheet was used as a test piece.

(Permanent Compression Set)

In accordance with JIS K 6262, a 12.0 mm thick pressed sheet was used as a test piece. The measurement was conducted under the conditions of 25% deformation at 70° C. for 22 hours or at 100° C. for 22 hours.

(Tensile Properties)

Tensile properties were determined in the following manner. In accordance with JIS K 6251 (Tensile Test Method of Vulcanized Rubber), a 2.0 mm thick pressed sheet was punched out to form a JIS No. 3 dumbbell test piece which was tested under the conditions of a stretching rate of 500 mm/min at 23° C. Autograph AG-10TB (manufactured by Shimadzu Corporation) was used as a measuring apparatus.

(Vibration Damping Properties)

Vibration damping properties were evaluated by dynamic viscoelasticity. In accordance with JIS K 6394 (Testing Method for Dynamic Properties of Vulcanized Rubber and Thermoplastic rubber), two test pieces measuring 5 mm long×6 mm wide×2 mm thick were cut out and the measurement was conducted at a shear mode under the conditions of a frequency of 10 Hz and strain of 0.05%. A dynamic viscoelasticity measuring apparatus DVA-200 (manufactured by IT Instrument Control Co., Ltd.) was used. Vibration damping properties were evaluated by the tan δ value. The larger this value, the better vibration damping properties.

(Abbreviations of Components Described in Examples)

APIB: polyisobutylene having an allyl group at the molecular ends (Production Example 1)

SIBS1: styrene-isobutylene-styrene block copolymer (Production Example 2)

SIBS2: styrene-isobutylene-styrene block copolymer (Production Example 3)

PP1: random polypropylene, manufactured by Grand Polymer Co., Ltd. under the trade name of "Grand Polypro J226EA"

PP2: random polypropylene, manufactured by Grand Polymer Co., Ltd. under the trade name of "Grand Polypro J215W"

PE1: high-density polyethylene, manufactured by SumitomoMitsui Polyolefin Co., Ltd. under the trade name of "Hizex 2200J"

PE2: low-density polyethylene, manufactured by SumitomoMitsui Polyolefin Co., Ltd. under the trade name of "Hizex L900N"

PE3: linear low-density polyethylene, manufactured by SumitomoMitsui Polyolefin Co., Ltd. under the trade name of "Hizex UJ580"

OIL: paraffinic process oil, manufactured by Japan Energy Corporation under the trade name of "P-500"crosslinking agent (hydrosilyl group-containing compound): polymethylhydrogensiloxane, manufactured by GE Toshiba Silicones Co., Ltd. under the trade name of "TSF-484"Crosslinking catalyst: 3 wt % xylene solution of 1,1,3,3-tetramethyl-1,3-dialkenyldisiloxane complex of platinum(0)

SEBS: styrene-ethylenebutylene-styrene block copolymer, manufactured by Kraton Polymer Japan Co., Ltd. under the trade name of "Kraton G1651"

SEPS: styrene-ethylenepropylene-styrene block copolymer, manufactured by Kuraray Co., Ltd. under the trade name of "Septon 4055"

PRODUCTION EXAMPLE 1

Production of Polyisobutylene Having an Alkenyl Group at the Molecular Ends (APIB)

After replacing the atmosphere in a polymerization vessel of a 2 L separable flask with nitrogen, 142 mL of ethylcyclohexane (dried with molecular sieves) and 427 mL of toluene (dried with molecular sieves) were charged using an injection syringe and the polymerization vessel was cooled by immersing in a dry ice/methanol bath at −70° C. Then, a Teflon® delivery tube was connected to a pressure-resistant glass liquefaction sampling tube equipped with a three-way cock and containing 277 mL (2934 mmol) of an isobutylene monomer and the isobutylene monomer was delivered into the polymerization vessel under nitrogen pressure. Then, 0.85 g (3.7 mmol) of p-dicumyl chloride and 0.68 g (7.4 mmol) of α-picoline were added, followed by the addition of 5.8 mL (52.7 mmol) of titanium tetrachloride. The reaction mixture was stirred for 2.5 hours after the initiation of the polymerization, and about 1 mL of the polymer slurry was withdrawn as a sample. Subsequently, a 75% mixed solution of allyltrimethylsilane (1.68 g, 11 mmol) in toluene was added in the polymerization vessel. 2 hours after the addition of the mixed solution, a large amount of water was added to terminate the reaction.

After the reaction solution was washed twice with water and the solvent was distilled off, the resulting polymer was dried in vacuum at 60° C. for 24 hours to obtain the objective block copolymer. The molecular weight of the resulting polymer was measured by gel permeation chromatography (GPC). The resulting polymer was polyisobutylene which has Mn of 45,500 and Mw/Mn of 1.10 and also has an allyl group at the molecular ends. The number of allyl groups at the molecular ends calculated by NMR was 2.0 per one molecule.

PRODUCTION EXAMPLE 2

Production of Styrene-Isobutylene-Styrene Block Copolymer (SIBS1)

After replacing the atmosphere in a polymerization vessel of a 500 mL separable flask with nitrogen, 95.4 mL of n-hexane (dried with molecular sieves) and 135 mL of butyl chloride (dried with molecular sieves) were charged using an injection syringe and the polymerization vessel was cooled by immersing in a dry ice/methanol bath at −70° C. Then, a Teflon® delivery tube was connected to a pressure-resistant glass liquefaction sampling tube equipped with a three-way cock and containing 54.4 mL (576 mmol) of an isobutylene monomer and the isobutylene monomer was delivered into the polymerization vessel under nitrogen pressure. Then, 0.178 g (0.77 mmol) of p-dicumyl chloride and 0.124 g (1.42 mmol) of N,N-dimethylacetamide were added, followed by the addition of 1.69 mL (15.44 mmol) of titanium tetrachloride. The reaction mixture was stirred for 75 minutes after the initiation of the polymerization, and about 1 mL of the polymer slurry was withdrawn as a sample. Subsequently, 13.83 g (132.8 mmol) of a styrene monomer was added in the polymerization vessel. 45 minutes after the addition of the styrene monomer, a large amount of water was added to terminate the reaction.

After the reaction solution was washed twice with water and the solvent was distilled off, the resulting polymer was dried in vacuum at 60° C. for 24 hours to obtain the objective block copolymer (SIBS1). The molecular weight of the resulting polymer was measured by gel permeation chromatography (GPC). As a result, Mn was 64,000 and Mw/Mn was 1.2. The styrene content calculated by NMR was 30%.

PRODUCTION EXAMPLE 3

Production of Styrene-Isobutylene-Styrene Block Copolymer (SIBS2)

After replacing the atmosphere in a polymerization vessel of a 500 mL separable flask with nitrogen, 97.6 mL of n-hexane (dried with molecular sieves) and 140.5 mL of butyl chloride (dried with molecular sieves) were charged using an injection syringe and the polymerization vessel was cooled by immersing in a dry ice/methanol bath at −70° C. Then, a Teflon® delivery tube was connected to a pressure-resistant glass liquefaction sampling tube equipped with a three-way cock and containing 47.7 mL (505.3 mmol) of an isobutylene monomer and the isobutylene monomer was delivered into the polymerization vessel under nitrogen pressure. Then, 0.097 g (0.42 mmol) of p-dicumyl chloride and 0.073 g (0.84 mmol) of N,N-dimethylacetamide were added, followed by the addition of 1.66 mL (15.12 mmol) of titanium tetrachloride. The reaction mixture was stirred for 75 minutes after the initiation of the polymerization, and about 1 mL of the polymer slurry was withdrawn as a sample. Subsequently, 13.71 g (131.67 mmol) of a styrene monomer was added in the polymerization vessel. 75 minutes after the addition of the styrene monomer, a large amount of water was added to terminate the reaction.

After the reaction solution was washed twice with water and the solvent was distilled off, the resulting polymer was dried in vacuum at 60° C. for 24 hours to obtain the objective block copolymer (SIBS2). The molecular weight of the resulting polymer was measured by gel permeation chromatography (GPC). As a result, Mn was 110,000 and Mw/Mn was 1.2. The styrene content calculated by NMR was 30%.

EXAMPLE 1

First step: After weighing 40 g of the total amount of APIB obtained in Production Example 1 and SIBS1 obtained in Production Example 2 in the ratio shown in Table 1, they were melt-kneaded for 3 minutes using a Labo Plastomill (manufactured by Toyo Seiki Seisaku-Sho, Ltd.) set to 170° C. A crosslinking agent was added in the proportion shown in Table 1 and 5 µl of a crosslinking catalyst was added, and then the mixture was dynamically crosslinked at 170° C. while melt-kneading until the torque value reached a maximum value. The melt-kneading was conducted for 3 minutes after the torque value reached a maximum value, and then a dynamically crosslinked composition (component (A)) was taken out.

Second step: After weighing 40 g of the total amount of the resulting component (A) and PP1 in the ratio shown in Table 1, they were melt-kneaded for 5 minutes using a Labo Plastomill set to 170° C. and a thermoplastic elastomer composition was taken out. The resulting thermoplastic elastomer composition could be easily formed into a sheet by using a hot-press (manufactured by Shinto Metal Industries, Ltd.) at 190° C. The hardness, permanent compression set and tensile properties of the resulting sheet were measured by the methods described above. The physical properties of the sheets are shown in Table 1.

EXAMPLES 2 TO 5

In the same manner as in Example 1, except that the amounts of APIB, SIBS1, the crosslinking agent and the crosslinking catalyst were replaced by the amounts shown in Table 1, thermoplastic elastomer compositions were obtained and physical properties were evaluated. The physical properties are shown in Table 1.

EXAMPLES 6 TO 9

In the same manner as in Example 5, except that PP2 was used as the olefinic resin and the amount of PP2 and the softener were replaced by the amounts shown in Table 1, thermoplastic elastomer compositions were obtained and physical properties were evaluated. The physical properties are shown in Table 1.

COMPARATIVE EXAMPLE 1

Using Labo Plastomill set to 170° C., 40 g of SIBS1 obtained in Production Example 2 was melt-kneaded for 5 minutes and taken out. Then, the resulting elastomer composition was formed into a sheet by using a hot-press (manufactured by Shinto Metal Industries, Ltd.) at 190° C. The hardness, permanent compression set and tensile properties of the resulting sheet were measured by the methods described above. The physical properties of the sheets are shown in Table 2.

COMPARATIVE EXAMPLE 2

After weighing 40 g of the total amount of SIBS1 and PP1 in the ratio shown in Table 2, they were melt-kneaded for 5 minutes using Labo Plastomill set to 170° C. and taken out. Then, the resulting elastomer composition was formed into a sheet by using a hot-press (manufactured by Shinto Metal Industries, Ltd.) at 190° C. The hardness, permanent compression set and tensile properties of the resulting sheet were measured by the methods described above. The physical properties of the sheets are shown in Table 2.

COMPARATIVE EXAMPLE 3

After weighing 40 g of the total amount of SEBS, PP1 and OIL in the ratio shown in Table 2, they were melt-kneaded for 5 minutes using Labo Plastomill set to 170° C. and taken out. Then, the resulting elastomer composition was formed into a sheet by using a hot-press (manufactured by Shinto Metal Industries, Ltd.) at 190° C. The hardness, permanent compression set and tensile properties of the resulting sheet were measured by the methods described above. The physical properties of the sheets are shown in Table 2.

COMPARATIVE EXAMPLE 4

After weighing 40 g of the total amount of SEBS, PP1 and OIL in the ratio shown in Table 2, they were melt-kneaded for 5 minutes using Labo Plastomill set to 170° C. and taken out. Then, the resulting elastomer composition was formed into a sheet by using a hot-press (manufactured by Shinto Metal Industries, Ltd.) at 190° C. The hardness, permanent compression set and tensile properties of the resulting sheet were measured by the methods described above. The physical properties of the sheets are shown in Table 2.

The vibration damping properties of the thermoplastic elastomer compositions obtained in Examples 3 and 5, and Comparatives Example 1, 3 and 4 were evaluated by dynamic viscoelasticity described above. The results are shown in Table 1 and Table 2.

As is apparent from the results shown in the tables described above, the thermoplastic elastomer compositions of Examples 1 to 5 of the present invention have improved permanent compression set as compared with the composition comprising SIBS (Comparative Example 1) and the composition comprising SIBS and PP1 (Comparative Example 2) of the prior art. In Examples 6 to 9, flexibility

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| First step | Component (A) | APIB | Parts by weight | 100 | 100 | 100 | 100 | 100 | 100 | 100 | 100 | 100 |
| | | SIBS1 | Parts by weight | 400 | 150 | 66 | 25 | 11 | 11 | 11 | 11 | 11 |
| | | Cross-linking agent | Parts by weight | 1.2 | 1.2 | 1.2 | 1.2 | 1.2 | 1.2 | 1.2 | 1.2 | 1.2 |
| | | Cross-linking catalyst | µl/40 g | 5 | 9 | 14 | 18 | 20 | 20 | 20 | 20 | 20 |
| Second step | Component (A) | | Parts by weight | 100 | 100 | 100 | 100 | 100 | 100 | 100 | 100 | 100 |
| | Component (B) | PP1 | Parts by weight | 20 | 20 | 20 | 20 | 20 | — | — | — | — |
| | | PP2 | Parts by weight | — | — | — | — | — | 25 | 25 | 35 | 50 |
| | | OIL | Parts by weight | — | — | — | — | — | 10 | 40 | 40 | 40 |
| Hardness (JIS-A/immediately after press) | | | | 61 | 57 | 62 | 58 | 65 | 70 | 60 | 68 | 75 |
| Permanent compression set (70° C. × 22 hours) | | | % | 68 | 64 | 52 | 47 | 31 | — | — | — | — |
| Permanent compression set (100° C. × 22 hours) | | | % | — | — | — | — | — | 26 | 23 | 39 | 48 |
| Tensile strength at break | | | MPa | 10.7 | 10.0 | 10.3 | 7.5 | 5.2 | 5.1 | 2.6 | 3.9 | 5.3 |
| Tensile elongation at break | | | % | 470 | 530 | 530 | 490 | 480 | 370 | 270 | 300 | 300 |
| tan δ (−20° C.) | | | | — | — | 0.75 | — | 0.62 | — | — | — | — |
| tan δ (0° C.) | | | | — | — | 0.57 | — | 0.43 | — | — | — | — |
| tan δ (20° C.) | | | | — | — | 0.30 | — | 0.24 | — | — | — | — |

TABLE 2

| | | Comparative Example 1 | Comparative Example 2 | Comparative Example 3 | Comparative Example 4 |
|---|---|---|---|---|---|
| PP1 | Parts by weight | — | 20 | 20 | 20 |
| OIL | Parts by weight | — | — | 70 | 70 |
| SIBS1 | Parts by weight | 100 | 100 | — | — |
| SEBS | Parts by weight | — | — | 100 | — |
| SEPS | Parts by weight | — | — | — | 100 |
| Hardness (JIS-A/immediately after press) | | 46 | 65 | 61 | 60 |
| Permanent compression set (70° C. × 22 hours) | % | 80 | 75 | 37 | 36 |
| Permanent compression set (100° C. × 22 hours) | % | 98 | 90 | — | — |
| Tensile strength at break | MPa | 12.6 | 11.4 | 15.6 | 15.5 |
| Tensile elongation at break | % | 520 | 460 | 720 | 830 |
| Tan δ (−20° C.) | | 0.88 | — | 0.33 | 0.24 |
| Tan δ (0° C.) | | 0.36 | — | 0.18 | 0.15 |
| Tan δ (20° C.) | | 0.24 | — | 0.11 | 0.10 | and satisfactory permanent compression set can be maintained by the addition of the plasticizer even if the amount of PP2 increases. As compared with the compositions of Comparative Example 3 and Comparative Example 4 of the prior art, the compositions of Example 3 and Example 5 have identical permanent compression set and are excellent in vibration damping properties.

EXAMPLES 10 TO 24

In the same manner as in Examples 1 to 9, sheets of the thermoplastic elastomer composition were formed according to the formulations shown in Table 3, and then the hardness, permanent compression set and tensile properties were measured by the methods described above. The physical properties of the sheets are shown in Table 3.

COMPARATIVES EXAMPLES 5 TO 8

In the same manner as in Comparative Examples 1 to 4, sheets of the thermoplastic elastomer composition were formed according to the formulations shown in Table 4, and then the hardness, permanent compression set and tensile properties were measured by the methods described above. The physical properties of the sheets are shown in Table 4.

TABLE 3

|  |  |  |  | Example 10 | Example 11 | Example 12 | Example 13 | Example 14 | Example 15 | Example 16 | Example 17 |
|---|---|---|---|---|---|---|---|---|---|---|---|
| First step | Component (A) | APIB | Parts by weight | 100 | 100 | 100 | 100 | 100 | 100 | 100 | 100 |
|  |  | PP2 | Parts by weight | 11 | 11 | 11 | — | — | — | 11 | — |
|  |  | PE1 | Parts by weight | — | — | — | 11 | 11 | 11 | — | 11 |
|  |  | PE2 | Parts by weight | — | — | — | — | — | — | — | — |
|  |  | PE3 | Parts by weight | — | — | — | — | — | — | — | — |
|  |  | OIL | Parts by weight | 40 | 40 | 40 | 40 | 40 | 40 | 40 | 40 |
|  |  | Crosslinking agent | Parts by weight | 1.2 | 1.2 | 1.2 | 1.2 | 1.2 | 1.2 | 1.2 | 1.2 |
|  |  | Crosslinking catalyst | μl/40 g | 16 | 16 | 16 | 16 | 16 | 16 | 16 | 16 |
| Second step | Component (A) |  | Parts by weight | 100 | 100 | 100 | 100 | 100 | 100 | 100 | 100 |
|  | Component (B) | PP2 | Parts by weight | 19 | 12 | 6 | — | 7 | 13 | 32 | — |
|  |  | PE1 | Parts by weight | — | 7 | 13 | 19 | 12 | 6 | — | 32 |
|  |  | OIL | Parts by weight | 26 | 26 | 26 | 26 | 26 | 26 | 73 | 73 |
| Final composition |  | APIB | Parts by weight | 100 | 100 | 100 | 100 | 100 | 100 | 100 | 100 |
|  |  | PP2 | Parts by weight | 40 | 29 | 20 |  | 11 | 20 | 60 |  |
|  |  | PE1 | Parts by weight |  | 11 | 20 | 40 | 29 | 20 |  | 60 |
|  |  | PE2 | Parts by weight |  |  |  |  |  |  |  |  |
|  |  | PE3 | Parts by weight |  |  |  |  |  |  |  |  |
|  |  | OIL | Parts by weight | 80 | 80 | 80 | 80 | 80 | 80 | 150 | 150 |
| Hardness (JIS-A/immediately after press) |  |  |  | 61 | 62 | 63 | 60 | 62 | 62 | 58 | 64 |
| Permanent compression set (100° C. × 22 hours) |  |  | % | 42 | 31 | 29 | 19 | 23 | 27 | 44 | 31 |
| Tensile strength at break |  |  | MPa | 3.4 | 3.4 | 3.4 | 3.1 | 3.9 | 3.6 | 2.6 | 2.3 |
| Tensile elongation at break |  |  | % | 360 | 340 | 350 | 330 | 400 | 400 | 340 | 270 |

|  |  |  |  | Example 18 | Example 19 | Example 20 | Example 21 | Example 22 | Example 23 | Example 24 |
|---|---|---|---|---|---|---|---|---|---|---|
| First step | Component (A) | APIB | Parts by weight | 100 | 100 | 100 | 100 | 100 | 100 | 100 |
|  |  | PP2 | Parts by weight | 11 | — | — | — | — | — | — |
|  |  | PE1 | Parts by weight | — | 11 | 25 | — | — | 25 | — |
|  |  | PE2 | Parts by weight | — | — | — | 25 | — | — | 25 |
|  |  | PE3 | Parts by weight | — | — | — | — | 25 | — | — |
|  |  | OIL | Parts by weight | 150 | 150 | 80 | 80 | 80 | 40 | 40 |
|  |  | Crosslinking agent | Parts by weight | 1.2 | 1.2 | 1.2 | 1.2 | 1.2 | 1.2 | 1.2 |
|  |  | Crosslinking catalyst | μl/40 g | 9 | 9 | 11 | 11 | 11 | 14 | 14 |
| Second step | Component (A) |  | Parts by weight | 100 | 100 | 100 | 100 | 100 | 100 | 100 |
|  | Component (B) | PP2 | Parts by weight | 19 | — | 7.3 | 7.3 | 7.3 | 9 | 9 |
|  |  | PE1 | Parts by weight | — | 19 | — | — | — | — | — |
|  |  | OIL | Parts by weight |  |  | — | — | — | 66 | 66 |
| Final composition |  | APIB | Parts by weight | 100 | 100 | 100 | 100 | 100 | 100 | 100 |
|  |  | PP2 | Parts by weight | 60 | 11 | 15 | 15 | 15 | 15 | 15 |
|  |  | PE1 | Parts by weight |  | 49 | 25 |  |  | 25 |  |
|  |  | PE2 | Parts by weight |  |  |  | 25 |  |  | 25 |
|  |  | PE3 | Parts by weight |  |  |  |  | 25 |  |  |
|  |  | OIL | Parts by weight | 150 | 150 | 80 | 80 | 80 | 150 | 150 |
| Hardness (JIS-A/immediately after press) |  |  |  | 58 | 60 | 63 | 58 | 50 | 60 | 51 |
| Permanent compression set (100° C. × 22 hours) |  |  | % | 42 | 33 | 23 | 23 | 29 | 33 | 24 |
| Tensile strength at break |  |  | MPa | 1.6 | 1.8 | 3.1 | 2.6 | 1.4 | 1.8 | 1.3 |
| Tensile elongation at break |  |  | % | 130 | 190 | 380 | 430 | 260 | 190 | 260 |

TABLE 4

|  |  | Comparative Example 5 | Comparative Example 6 | Comparative Example 7 | Comparative Example 8 |
|---|---|---|---|---|---|
| SIBS2 | Parts by weight | 100 | 100 | 100 | 100 |
| PP2 | Parts by weight | 40 | — | 60 | — |
| PE1 | Parts by weight | — | 40 | — | 60 |
| OIL | Parts by weight | 80 | 80 | 150 | 150 |
| Hardness (JIS-A/immediately after press) |  | 54 | 51 | 57 | 54 |
| permanent compression set (100° C. × 22 hours) | % | 88 | 80 | 84 | 80 |
| Tensile strength at break | MPa | 3.4 | 3.0 | 1.7 | 1.7 |
| Tensile elongation at break | % | 450 | 440 | 260 | 270 |

The final compositions of Examples 10 to 15 and Examples 20 to 22 comprise 40 parts by weight of the total amount of olefinic resin and 80 parts by weight of the softener based on 100 parts by weight of APIB. The compositions of Comparative Examples 5 and 6 comprise the same components, except that APIB is replaced by SIBS. As is apparent from a comparison between them, all thermoplastic elastomer compositions of the present invention are excellent in permanent compression set regardless of the same hardness (flexibility). This fact shows that the effect of the present invention is exerted even when the olefinic resin is random polypropylene, high-density polyethylene, and a mixture thereof. The same fact is confirmed in a comparison between the compositions of Examples 16 to 19 and the compositions of Comparative Examples 7 and 8 with a large proportion of the olefinic resin and the softener.

As is apparent from the compositions of Examples 20 to 24, when the olefinic resin is high-density polyethylene, low-density polyethylene and linear low-density polyethylene, excellent permanent compression set was obtained and the effect of the present invention was confirmed in case of various olefinic resins.

As compared with the composition of Example 10 wherein only random polypropylene was used as the olefinic resin, the compositions of Examples 11 to 15 wherein a portion or all of the olefinic resin is high-density polyethylene are excellent in permanent compression set. Therefore, the effect of the present invention is most remarkable when using polyethylene as the olefinic resin. In case of the compositions of Example 16 to 19 with a large proportion of the olefinic resin and the softener, the same results are obtained.

INDUSTRIAL APPLICABILITY

The thermoplastic elastomer composition of the present invention can be molded by the molding method and the molding apparatus employed commonly for thermoplastic resins and can be melt-molded, for example, by extrusion molding, injection molding, press molding, blow molding or the like. The thermoplastic elastomer composition of the present invention can be effectively used to produce sealing materials such as packing materials, sealants, gaskets and plug, and dampers for optical driving, insulators for hard disk driving devices, dampers for civil engineering and construction, damping materials for automobiles, damping materials for railway vehicles, damping materials for domestic appliances, vibration-proof materials, automotive interior materials, cushioning materials, daily necessities, electric parts, electronic parts, sporting equipments, grips, shock absorbing materials, electric wire coating materials, packaging materials, various containers and writing materials because of its excellent moldability, flexibility, vibration damping properties, gas barrier properties and permanent compression set.

The invention claimed is:

1. A thermoplastic elastomer composition comprising:
   a dynamically crosslinked first component (A) obtained by crosslinking an isobutylene polymer having an alkenyl group at the molecular ends with a hydrosilyl group-containing compound while melt-kneading in the presence of at least one of an aromatic vinyl-containing thermoplastic elastomer and an olefinic resin, and
   a second component (B) comprising at least one of an aromatic vinyl-containing thermoplastic elastomer and an olefinic resin;
   said second component (B) being mixed with said dynamically crosslinked first component (A) to form said thermoplastic elastomer composition.

2. The thermoplastic elastomer composition according to claim 1, wherein in the component (A) the content of at least one of an aromatic vinyl-containing thermoplastic elastomer and an olefinic resin is from 5 to 100 parts by weight based on 100 parts by weight of the isobutylene polymer having an alkenyl group at the molecular ends.

3. The thermoplastic elastomer composition according to claim 1, wherein the content of the component (B) is from 5 to 100 parts by weight based on 100 parts by weight of the total amount of the component (A).

4. The thermoplastic elastomer composition according to claim 1, which further contains a softener (C) in the amount of 1 to 300 parts by weight based on 100 parts by weight of the isobutylene polymer having an alkenyl group at the molecular ends in the component (A).

5. The thermoplastic elastomer composition according to claim 1, wherein an allyl group is introduced into the molecular ends of the isobutylene polymer having an alkenyl group at the molecular ends in the component (A) by a substitution reaction of allyltrimethylsilane and chlorine.

6. The thermoplastic elastomer composition according to claim 1, wherein the isobutylene polymer having an alkenyl group at the molecular ends in the component (A) is a polymer which has a number average molecular weight of 1,000 to 500,000 and has at least 0.2 alkenyl groups per one molecule at the molecular ends.

7. The thermoplastic elastomer composition according to claim 1, wherein the isobutylene polymer having an alkenyl group at the molecular ends in the component (A) is a polymer having 50% by weight or more of isobutylene.

8. The thermoplastic elastomer composition according to claim 1, wherein the aromatic vinyl-containing thermoplastic elastomer in the component (A) and (B) is a block copolymer comprising a polymer block (a) composed mainly of an aromatic vinyl compound and a polymer block (b) composed mainly of isobutylene.

9. The thermoplastic elastomer composition according to claim 8, wherein the aromatic vinyl-containing thermoplastic elastomer in the components (A) and (B) is a block copolymer is a triblock copolymer which has a structure comprising a polymer block (a) composed mainly of an aromatic vinyl compound—a polymer block (b) composed mainly of isobutylene—a polymer block (a) composed mainly of an aromatic vinyl compound, and has a weight average molecular weight of 40,000 to 200,000.

10. The thermoplastic elastomer composition according to claim 1, wherein the olefinic resin in the component (A) is polypropylene.

11. The thermoplastic elastomer composition according to claim 1, wherein the olefinic resin in the component (A) is polyethylene.

12. The thermoplastic elastomer composition according to claim 1, wherein the olefinic resin in the component (B) is polypropylene.

13. The thermoplastic elastomer composition according to claim 1, wherein the olefinic resin in the component (B) is polyethylene.

14. The thermoplastic elastomer composition according to claim 10, wherein the olefinic resin in the component (A) is random polypropylene.

15. The thermoplastic elastomer composition according to claim 11, wherein the olefinic resin in the component (A) is high-density polyethylene.

16. The thermoplastic elastomer composition according to claim 12, wherein the olefinic resin in the component (B) is random polypropylene.

17. The thermoplastic elastomer composition according to claim 13, wherein the olefinic resin in the component (B) is high-density polyethylene.

18. The thermoplastic elastomer composition according to claim 4, wherein the softener (C) is paraffinic oil.

* * * * *